United States Patent
Veeraswamy (10) Patent No.: US 9,069,682 B1
(45) Date of Patent: Jun. 30, 2015

(54) ACCELERATING FILE SYSTEM RECOVERY BY STORING FILE SYSTEM METADATA ON FAST PERSISTENT STORAGE DURING FILE SYSTEM RECOVERY

(75) Inventor: Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 13/538,104

(22) Filed: Jun. 29, 2012

(51) Int. Cl.
*G06F 12/08* (2006.01)
*G06F 11/00* (2006.01)
*G06F 17/30* (2006.01)
*G06F 11/14* (2006.01)

(52) U.S. Cl.
CPC ...... *G06F 12/0888* (2013.01); *G06F 2212/466* (2013.01); *G06F 11/1435* (2013.01); *G06F 12/0866* (2013.01); *G06F 17/30067* (2013.01); *G06F 17/30132* (2013.01)

(58) Field of Classification Search
CPC ............ G06F 12/0888; G06F 12/0866; G06F 2212/466; G06F 11/1435; G06F 17/30067; G06F 17/30132
See application file for complete search history.

(56) References Cited

U.S. PATENT DOCUMENTS

| | | | |
|---|---|---|---|
| 6,438,661 B1 * | 8/2002 | Beardsley et al. | 711/144 |
| 6,678,788 B1 | 1/2004 | O'Connell | |
| 6,691,209 B1 | 2/2004 | O'Connell | |
| 6,718,481 B1 | 4/2004 | Fair | |
| 6,865,157 B1 | 3/2005 | Scott et al. | |
| 7,219,260 B1 | 5/2007 | de Forest et al. | |
| 7,627,779 B2 | 12/2009 | Fair | |
| 7,730,090 B2 | 6/2010 | Godbole | |
| 7,818,302 B2 | 10/2010 | Godbole | |
| 7,870,356 B1 | 1/2011 | Veeraswamy et al. | |
| 7,900,088 B1 | 3/2011 | Pawar et al. | |
| 8,145,947 B1 | 3/2012 | Hayden et al. | |
| 8,661,068 B1 * | 2/2014 | Seibel et al. | 707/825 |
| 2010/0153347 A1 * | 6/2010 | Koester et al. | 707/691 |
| 2012/0239860 A1 * | 9/2012 | Atkisson et al. | 711/103 |

* cited by examiner

*Primary Examiner* — Tuan Thai
*Assistant Examiner* — Glenn Gossage
(74) *Attorney, Agent, or Firm* — BainwoodHuang (57) ABSTRACT

A system and method for providing a faster disk recovery is provided by bypassing the file system cache temporarily holding a sub set of metadata objects of the file system and instead using a persistent fast storage that can be accessed at deterministic speeds to hold all the metadata objects of the file system. The system speeds recovery by only writing updated metadata objects to the persistent disk storage when file system recovery is complete.

20 Claims, 6 Drawing Sheets

ACCELERATING FILE SYSTEM RECOVERY BY STORING FILE SYSTEM METADATA ON FAST PERSISTENT STORAGE DURING FILE SYSTEM RECOVERY

BACKGROUND

In a conventional file system both user data objects and metadata objects are stored on a persistent storage such as an inexpensive disk drive. A fast cache constructed of volatile memory is used to temporarily store a subset of the user data objects and metadata objects. The fast cache also reduces access time between a processor attempting to access the user data objects and metadata objects and the same objects on the persistent storage.

The fast cache stores only a subset of the total set of user data objects and metadata objects. The logic controlling the fast cache may recognize the need to store a new metadata object in the fast cache, but determine that there is no room in fast cache to store the object. When this occurs, the least recently used (LRU) object in the subset of data objects and metadata objects is replaced. If the LRU object has not been updated (i.e., dirtied) it is simply discarded, as a valid copy of the object will exist on the underlying persistent storage. If the object has been dirtied, the object will be written to persistent storage prior to the new object replacing the LRU object. However, the storage processor may partition the cache in any number of ways to store objects and use any number of cache replacement algorithms to perform object replacement within the cache.

In recovery of file systems, the storage processor uses a recovery tool, such as "fsck", to scan and recover the set of metadata objects of the file system. When internal inconsistencies between individual metadata objects are found, the metadata objects with inconsistencies are updated. Given the large number of metadata objects in any file system, the number of metadata objects loaded, discarded or written back to persistent storage is great. In many cases, the same metadata object would be loaded, dirtied and then flushed while running the file system recovery tool.

SUMMARY

Unfortunately, there are deficiencies with the above-described conventional system. For example, the time to recover a file system using a file system recovery tool is great due to the large number of metadata objects that are read, potentially updated, and then written back to disk. Additionally, the time to write any dirtied metadata block is non-deterministic, as factors such as disk location, disk head movement and channel bandwidth availability vary. This leads to variable times for writes potentially lengthening file system recovery. Additionally, the large number of metadata objects that are read, potentially updated, and then written back to disk also take up room in the fast cache that is otherwise occupied by user data objects.

To overcome the above described deficiencies, an improved technique includes a file system with accelerated recovery time using a persistent fast storage for the storage of metadata blocks that bypasses the cache. The system maps the storage of metadata objects from a cache and persistent disk storage to a fast persistent storage. The recovery then updates metadata blocks of the file system in only the persistent fast storage returning the metadata objects to the persistent disk storage and enabling the cache for metadata objects when the recovery is complete.

Advantageously, the improved technique dramatically lowers the time to recover a file system by using a disk with deterministic access time and frees the cache for use by user data objects during the recovery period.

In one embodiment, a method is described of accelerating file system recovery time using multi-tiered storage where the set of the metadata objects stored on an inexpensive disk storage accessed via volatile cache are instead stored on a Solid State Disk (SSD) or other persistent fast storage that bypasses the cache during file system recovery.

The method includes a step of configuring a persistent fast storage to store the set of metadata objects stored on the persistent disk storage, then disabling the volatile cache from storing a subset of metadata objects of the set of metadata objects stored in the persistent disk storage. Having bypassed the volatile cache, all updating to the set of metadata objects is performed in the persistent fast storage during file system recovery.

When the file system recovery is complete, the system is configured such that the set of metadata objects of the file system is stored on the persistent disk storage. This is accomplished by copying the set of metadata objects from the persistent fast storage to the persistent disk storage and enabling the set of metadata objects in persistent disk storage to be accessed via the subset of metadata objects in the volatile cache memory.

In another embodiment a storage system accelerating file system recovery time is provided. The system includes a persistent disk storage storing a set of metadata objects of a file system, a persistent fast storage storing the set of metadata objects of a file system during system recovery and a volatile cache memory configured to cache a subset of the set of metadata objects of a file system during normal file system processing. The various storages are controlled during file system recovery by a controller including controlling circuitry, the controlling circuitry being constructed and configured to configure the persistent fast storage to store the set of metadata objects stored on the persistent disk storage. Then the subset of metadata objects is disabled from being accessed via the volatile cache memory. After the volatile cache memory is disabled, the set of metadata objects stored in the persistent fast storage is updated. Once the metadata objects are updated and the file system recovery is complete, the persistent disk storage is configured to store the set of metadata objects stored on the persistent fast storage.

In another embodiment, the method described above is performed by a computer program product stored on a non-transitory computer readable storage medium and executed by a microprocessor.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
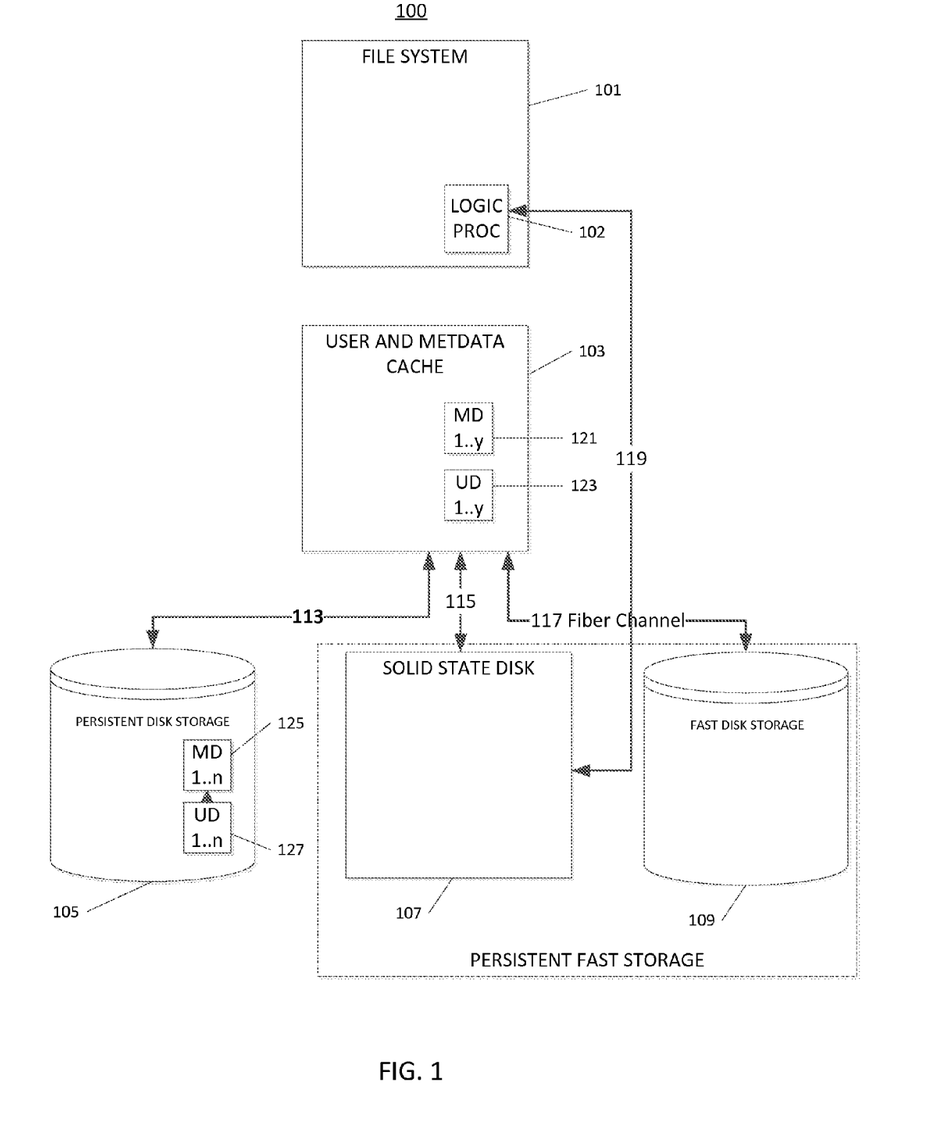
FIG. 1 is a schematic diagram illustrating a storage processor with a multi-tiered architecture configured and constructed to quickly recover a file system.

FIG. 1 is a schematic diagram illustrating a storage processor 100 with a multi-tiered architecture. The storage processor 100 includes a file system 101 with file system logic for performing the functions of the system. The storage processor 100 also includes a cache 103 for temporarily storing user metadata objects 121 (1 . . . y) and user data objects 123 (1 . . . y). The user metadata objects 121 (1 . . . y) and user data objects (1 . . . y) are a subset of the user metadata objects 125 (1 . . . n) and user data objects 127 (1 . . . n) stored on the persistent disk storage.

It is understood that the file system 101 provides metadata such as directories and inodes of the file system that provide an internal hierarchy of the file system and describe the user data of the file system. For example, inodes store information about files and directories or folders, such as the owner, access mode (read, write and execute permissions), and file type such as fixed or stream. As such the number of inodes found on persistent disk storage is quite large.

To prevent the storage processor 100 writing metadata objects each time they are updated or dirtied, the storage processor 100 holds metadata objects in the volatile cache memory 103 thus reducing the amount of throughput via connection 113 to the underlying persistent disk storage 105. It is understood that persistent disk storage 105 is inexpensive disk storage. It is understood that meta-data objects 121 and user data objects 123 are held in both the volatile cache memory 103 and the persistent disk storage 105. Writes or updates to meta-data object 121 may persist in the volatile cache memory 103 for an unknown period of time until they are finally written to the persistent disk storage 105.

The storage processor 100 also comprises persistent fast storage including SSD 107 and fast disk storage 109 (sometimes referred to herein as fast disk 109). It is understood that persistent fast storage 109 is expensive fast disk storage. Both SSD 107 and fast disk storage 109 may be internally connected to volatile cache memory 103 via connection 115 and fiber channel 117. Likewise during system recovery the SSD 107 and fast disk storage 109 may be connected to the logic processor 102 of the file system 101. The logic processor 102 can be a processor programmed to perform a method of file system recovery from a program stored on persistent disk storage 105 or the like. The logic processor 102 may also be a circuit specifically arranged and constructed to perform the steps of the method described herein. During normal processing the SSD 107 and fast disk 109 may be included in the normal processing of the file system.

The file system 101 provides logic processor 102 for processing the updates to the file system. The dirtied metadata objects held in the cache must be held in a consistent state. Underlying errors in the metadata objects held in volatile cache 103 and persistent disk storage 105 will cause problems in file system processing. Such errors can be caused by underlying device errors, for example, in the persistent disk storage 105 or the logic processor 102 of the file system 101 processing file system updates in an order that can cause inconsistencies.

Detection of these errors will require the metadata objects to be placed back into a consistent state. The instant system recovers the file system by bypassing the volatile cache memory 103 and instead using the SSD 107 or fast disk 109 to hold all the objects.

In such a case, a connection 119 is used between the logic processor and persistent fast storage such as SSD 107 or fast disk 109. The connection may be via fiber channel or other conduit providing fast access to persistent storage.

Figure 2:
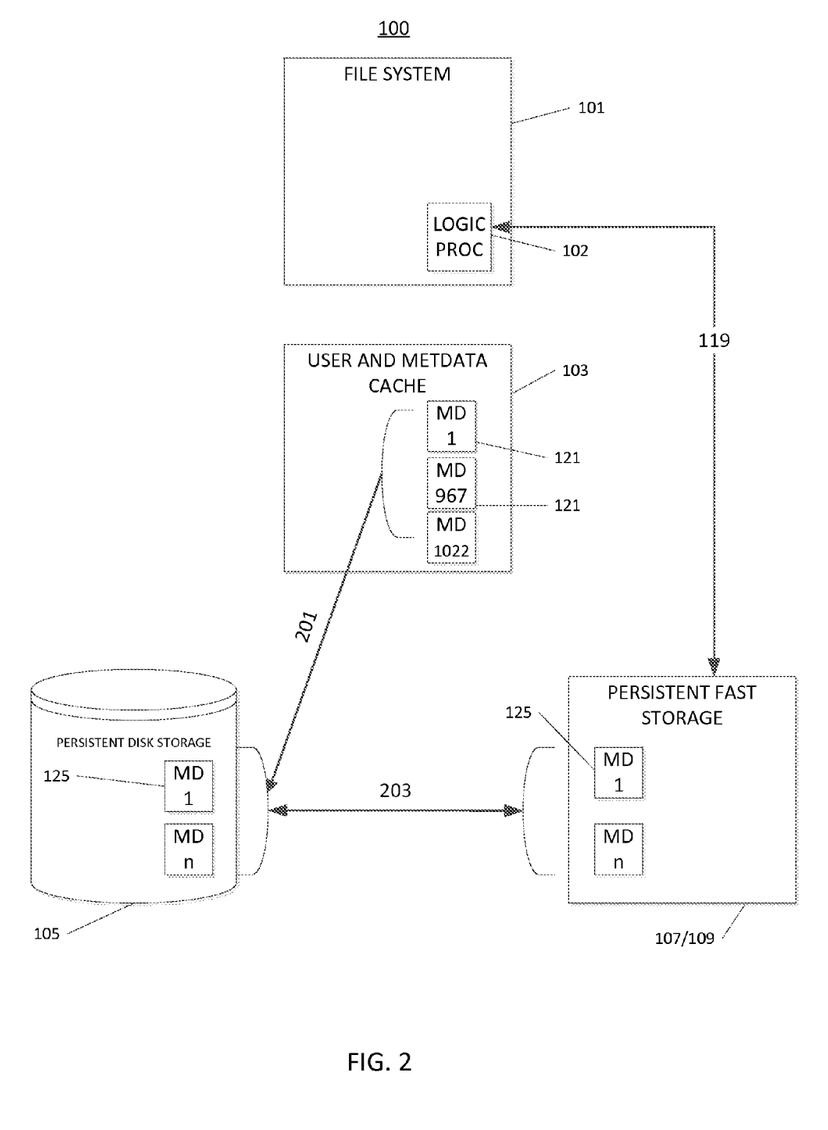
FIG. 2 is a schematic diagram illustrating a storage processor constructed and configured to switch to using a persistent fast disk en-mass.

FIG. 2 is a schematic diagram illustrating a storage processor 100 constructed and configured to switch to using a persistent fast storage 107/109 en-mass. The subset of metadata objects $121_1$, $121_{967}$ and $121_{1022}$ are in a dirty state (i.e., modified but not stored in persistent storage) and are written 201 to the persistent disk storage 105 in one movement prior to recovery of the file system.

Once the subset of metadata objects $121_1$, $121_{967}$ and $121_{1022}$ are stored on the persistent disk storage 105, then a bulk copy of metadata objects $125_{1 \ldots n}$ stored on the persistent disk storage 105 can be copied 203 to the persistent fast storage (i.e., SSD 107 or Fast disk 109). The volatile cache memory is effectively cut from the file system 101, at least as to metadata objects. As there are no metadata objects in the volatile cache memory 103, it would be understood that the user data objects could fill the volatile cache memory 103 replacing expired entries holding the subset of metadata objects $121_{1 \ldots y}$.

It may also be advantageous to only copy dirty objects of the subset of metadata objects $121_{1 \ldots y}$ in the volatile cache memory 103 when the dirty objects need to be updated.

Figure 3:
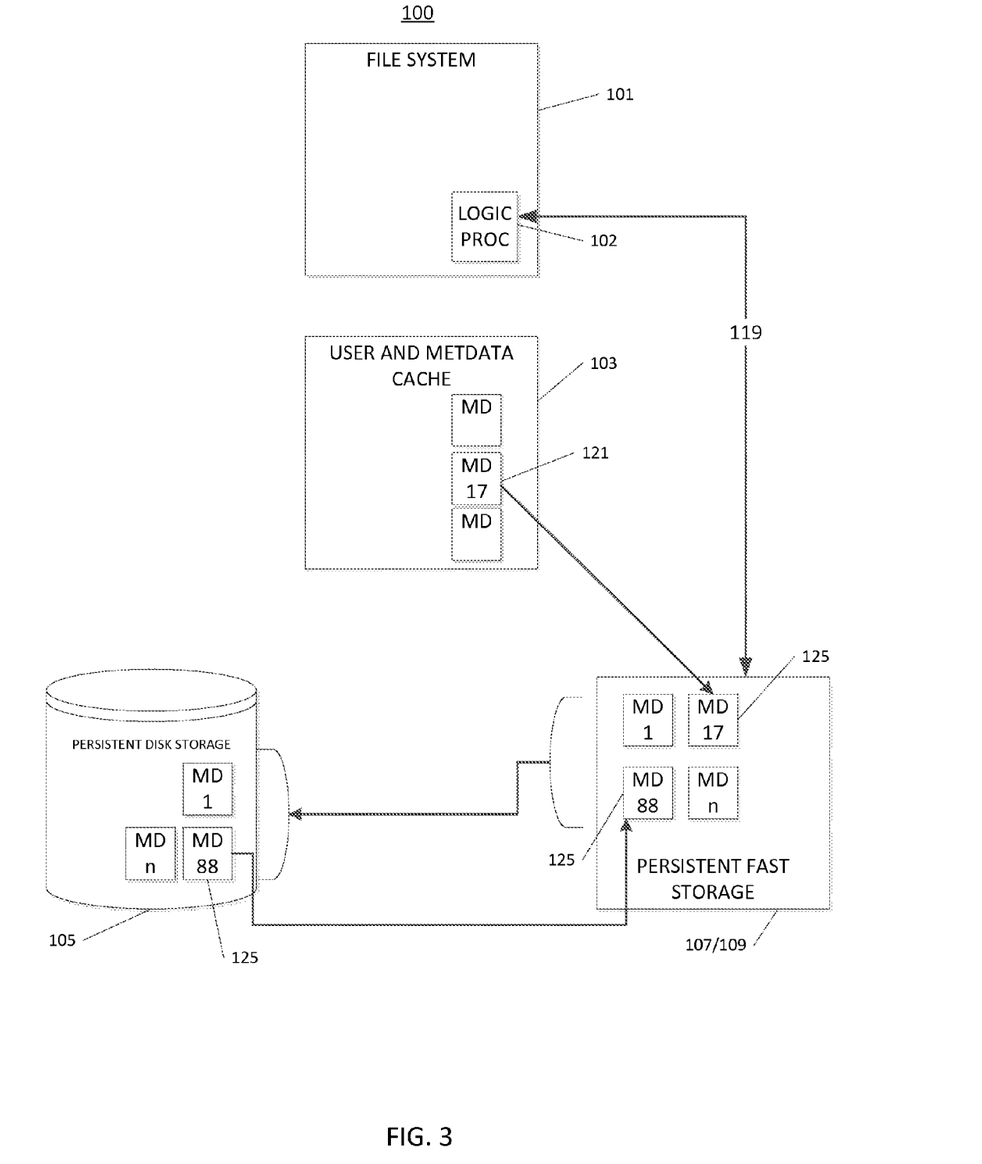
FIG. 3 is a schematic illustrating a storage processor constructed and configured to switch to using a persistent fast disk object-by-object.

FIG. 3 is a schematic diagram illustrating a storage processor constructed and configured to switch to using a persistent fast disk object-by-object. The subset of metadata objects $121_{17}$ and $125_{88}$ are written by the storage processor 100 to the persistent disk storage 105 in an as needed basis during recovery of the file system.

When attempting to update the metadata object $125_{17}$ on the persistent fast storage (107, 109), it must first be determined if metadata object $125_{17}$ exists in the persistent fast storage (107, 109). If metadata object $125_{17}$ doesn't exist in the persistent fast storage (107, 109), then it is determined if metadata object $121_{17}$ exists in the volatile cache memory 103. If it exists, then metadata object $121_{17}$ is copied from the volatile cache memory 103 to the persistent fast storage (107, 109).

As shown, the metadata object $125_{88}$ exists in the persistent disk storage 105, but not in the volatile cache memory 103. In this case, metadata object $125_{88}$ is simply copied from the persistent disk storage 105 to the persistent fast storage (107, 109).

Figure 4:
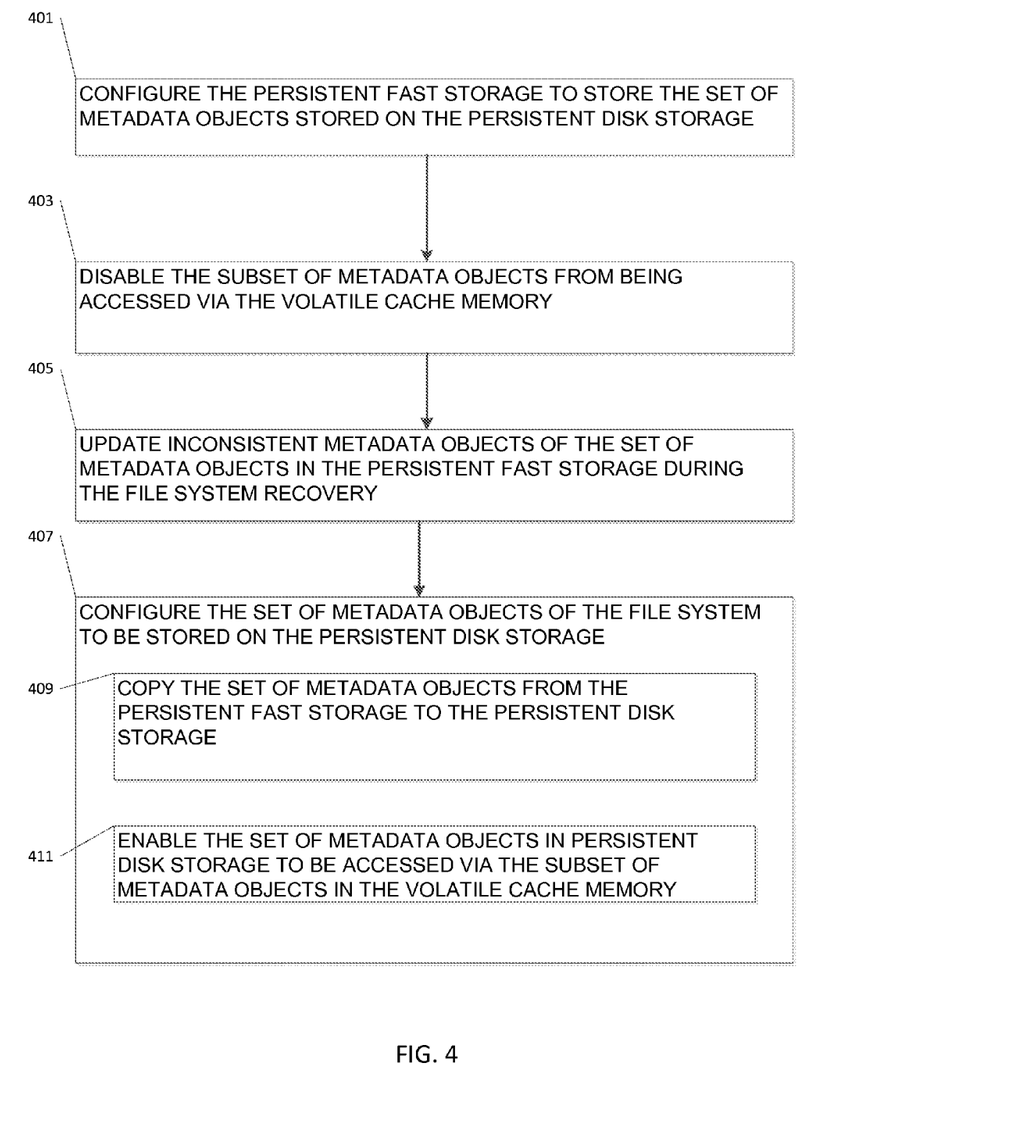
FIG. 4 is a flow chart illustrating a method of configuring a storage processor to recover a file system without using a volatile cache memory for metadata objects.

FIG. 4 is a flow chart illustrating a method of configuring the storage processor 100 to recover the file system 101 without using the volatile cache memory 103 for metadata objects. In step 401 of the method, the storage system 100 is altered by configuring the persistent fast storage (i.e., SSD 107, Fast disk 109) to store the set of metadata objects $125_{1 \ldots n}$ stored on the persistent disk storage 105. Then, in step 403 the storage processor 100 is altered by disabling the subset of metadata objects $121_{1 \ldots y}$ from being accessed via the volatile cache memory 103. In the next step 405, inconsistent metadata objects of the set of metadata objects $125_{1 \ldots n}$ are updated in the persistent fast storage (i.e., SSD 107, Fast disk 109) during the file system recovery. During this time, no object of the set of metadata objects $125_{1 \ldots n}$ is modified in the volatile cache memory 103. Instead the volatile cache memory 103 is bypassed using the connection 119. Finally, in step 407 persistent disk storage 105 is configured to store the set of metadata objects $125_{1...n}$ of the file system 101. In step 409, once the storage system 100 is so configured, the set of metadata objects $125_{1...n}$ is copied from the persistent fast storage (107, 109) to the persistent disk storage 105. Then, in step 411, the set of metadata objects $125_{1...n}$ in persistent disk storage 105 is enabled to be accessed via the subset of metadata objects in the volatile cache memory 103.

When an error or inconsistency is discovered by the file system, the file system may still be active. In such a case there may be a subset of metadata objects $121_{1...y}$ stored in the volatile cache memory. When this occurs, dirty metadata blocks will need to be transferred from the volatile cache memory to the persistent disk storage or to the persistent fast storage (i.e., SSD 107 or Fast disk 109).

Figure 5:
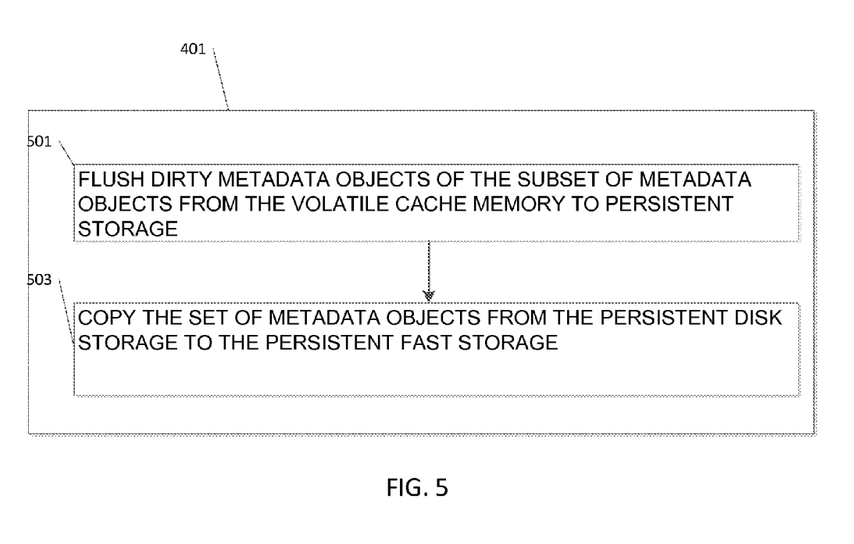
FIG. 5 is a flow chart illustrating a method of performing a switch to a persistent fast disk en-mass.

FIG. 5 is a flow chart illustrating a method of performing a switch to a persistent fast disk en-mass, which method is a sub step of step 401 in FIG. 4. At step 501, the storage processor flushes dirty metadata objects of the subset of metadata objects $121_{1...y}$ from the volatile cache memory 103 to persistent disk storage 105 and next at step 503, copies the set of metadata objects from the persistent disk storage 105 to the persistent fast storage (i.e., SSD 107 or Fast disk 109).

As such the metadata objects are not copied all at once, but as needed. In step 405 (see FIG. 4), an attempt to update a metadata object in the persistent fast storage (i.e., SSD 107 or Fast disk 109) is performed.

Figure 6:
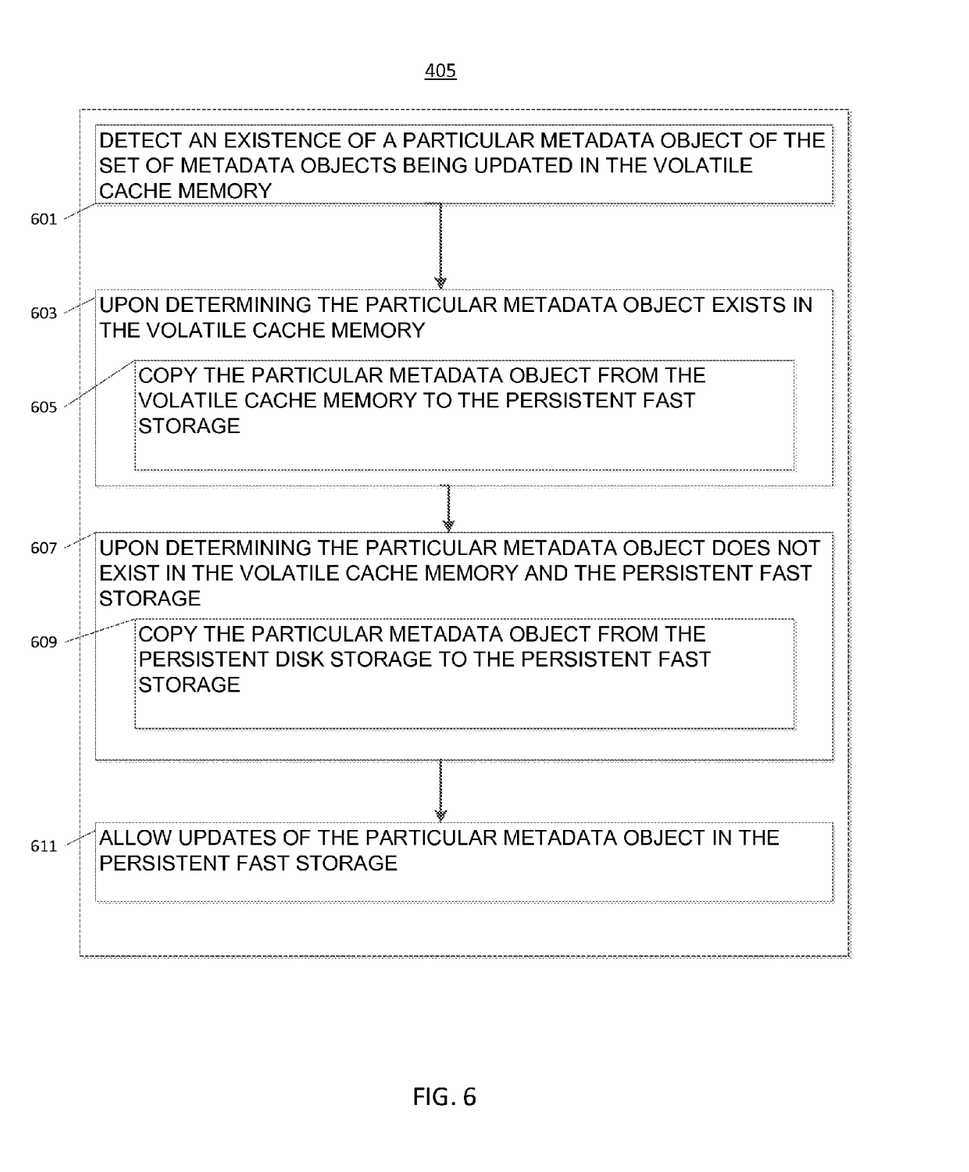
FIG. 6 is a flow chart illustrating a method of performing a switch to a persistent fast disk object-by-object.

FIG. 6 is a flow chart illustrating a method of performing a switch to a persistent fast storage 107/109 object-by-object. The method illustrated in FIG. 6 is a substep of step 405 in FIG. 4. At step 601, the existence of a particular metadata object of the set of metadata objects $125_{1...n}$ being updated in the volatile cache memory 103 is first detected. At step 603, upon determining that the particular metadata object exists in the volatile cache memory 103, at step 605, the particular metadata object is copied from the volatile cache memory 103 to the persistent fast storage (107, 109). However, at step 607, upon determining that the particular metadata object does not exist in the volatile cache memory 103 and the persistent fast storage (107, 109), at step 609, the particular metadata object is copied from the persistent disk storage 105 to the persistent fast storage (107, 109). Finally, at step 611, the update of the particular metadata object in the persistent fast storage (107, 109) is allowed.

While various embodiments of the present disclosure have been particularly shown and described, it will be understood by those skilled in the art that various changes in form and details may be made therein without departing from the spirit and scope of the present disclosure as defined by the appended claims.

For example, the term metadata objects of the file system is used for reasons of simplicity. It would be understood that the object may be a single inode, or a series of inodes in a disk block, or even a series of blocks (i.e., a slice) holding a series of inodes. Thus, the update, transfer or copy of a metadata object may be, but not limited to any of these data structures or physical blocks.

What is claimed is:

1. A method of accelerating recovery of a file system in a multi-tiered storage system, the multi-tiered storage system including a volatile cache memory, persistent fast storage and persistent disk storage, the persistent disk storage storing a set of metadata objects of the file system, the volatile cache memory temporarily storing a subset of the set of metadata objects of the file system, the method comprising:

configuring the persistent fast storage to store the set of metadata objects stored on the persistent disk storage;
disabling the subset of the set of metadata objects from being accessed via the volatile cache memory;
updating inconsistent metadata objects of the set of metadata objects stored on the persistent fast storage during the recovery of the file system; and
configuring the persistent disk storage to store the set of metadata objects of the file system stored on the persistent fast storage.

2. The method of claim 1, wherein configuring the persistent fast storage to store the set of metadata objects stored on the persistent disk storage includes:
flushing dirty metadata objects of the subset of metadata objects from the volatile cache memory; and
copying the set of metadata objects from the persistent disk storage to the persistent fast storage.

3. The method of claim 1, wherein updating the inconsistent metadata objects of the set of metadata objects stored on the persistent fast storage during the file system recovery includes:
detecting an existence of a particular metadata object of the set of metadata objects being updated in the volatile cache memory and the persistent fast storage;
upon determining that the particular metadata object exists in the volatile cache memory but not the persistent fast storage:
copying the particular metadata object from the volatile cache memory to the persistent fast storage;
upon determining that the particular metadata object does not exist in the volatile cache memory and the persistent fast storage:
copying the particular metadata object from the persistent disk storage to the persistent fast storage; and
allowing update of the particular metadata object on the persistent fast storage.

4. The method of claim 1, wherein the method further comprises replacing the subset of the set of metadata objects in the volatile cache memory with user data objects.

5. The method of claim 1, wherein the method further comprises, after disabling the subset of the set of metadata objects from being accessed via the volatile cache memory, bypassing the volatile cache memory in favor of the persistent fast storage.

6. The method of claim 1, wherein configuring the persistent disk storage to store the set of metadata objects of the file system stored on the persistent fast storage includes:
copying the set of metadata objects from the persistent fast storage to the persistent disk storage.

7. The method of claim 6, further comprising:
enabling the set of metadata objects in persistent disk storage to be accessed via the subset of the set of metadata objects in the volatile cache memory.

8. The method of claim 6, wherein each metadata object of the set of metadata objects is copied back to a same location in the persistent disk storage that the metadata object occupied prior to being copied to the persistent fast storage.

9. A storage system configured to accelerate recovery of a file system, the storage system comprising:
a persistent disk storage storing a set of metadata objects of the file system;
a persistent fast storage storing the set of metadata objects of the file system during the recovery of the file system;
a volatile cache memory configured to cache a subset of the set of metadata objects of the file system during normal file system processing;

a controller including controlling circuitry, the controlling circuitry being constructed and configured to perform the recovery of the file system upon the file system moving from a normal processing state to a recovery state, the controlling circuitry configured to:
  configure the persistent fast storage to store the set of metadata objects stored on the persistent disk storage;
  disable the subset of the set of metadata objects from being accessed via the volatile cache memory;
  update inconsistent metadata objects of the set of metadata objects in the persistent fast storage during the recovery of the file system; and
  configure the persistent disk storage to store the set of metadata objects of the file system stored on the persistent fast storage.

10. The system of claim 9, wherein the controlling circuitry that is configured to configure the persistent fast storage to store the set of metadata objects is further configured to:
  flush dirty metadata objects of the subset of metadata objects from the volatile cache memory to the persistent disk storage; and
  copy the set of metadata objects from the persistent disk storage to the persistent fast storage.

11. The system of claim 9, wherein the controlling circuitry that is configured to update the inconsistent metadata objects of the set of metadata stored in the persistent fast storage is further configured to:
  detect an existence of a particular metadata object of the set of metadata objects being updated in the volatile cache memory and the persistent fast storage;
  upon determining that the particular metadata object exists in the volatile cache memory but not the persistent fast storage:
    copy the particular metadata object from the volatile cache memory to the persistent fast storage;
  upon determining that the particular metadata object does not exist in the volatile cache memory and persistent fast storage:
    copy the particular metadata object from the persistent disk storage to the persistent fast storage; and
  allow update of the particular metadata object in the persistent fast storage.

12. The system of claim 9, wherein the controlling circuitry that is configured to configure the persistent fast storage to store the set of metadata objects in the persistent disk storage is further configured to:
  copy the metadata objects from the persistent fast storage to the persistent disk storage.

13. The system of claim 12, the controlling circuitry being further configured to:
  enable the set of metadata objects in persistent disk storage to be accessed via the subset of the set of metadata objects in the volatile cache memory.

14. The system of claim 12, wherein each metadata object of the set of metadata objects is copied back to a same location in the persistent disk storage that the metadata object occupied prior to being copied to the persistent fast storage.

15. A non-transitory computer readable storage medium with a computer program stored thereon, the computer program executed by a processor causing the processor to perform a method of accelerating recovery of a file system in a multi-tiered storage system, the multi-tiered storage system including a volatile cache memory, persistent fast storage and persistent disk storage, the persistent disk storage storing a set of metadata objects of the file system, the volatile cache memory temporarily storing a subset of the set of metadata objects of the file system, the method comprising:
  configuring the persistent fast storage to store the set of metadata objects stored on the persistent disk storage;
  disabling the subset of the set of metadata objects from being accessed via the volatile cache memory;
  updating inconsistent metadata objects of the set of metadata objects stored on the persistent fast storage during the recovery of the file system; and
  configuring the persistent disk storage to store the set of metadata objects of the file system stored on the persistent fast storage.

16. The non-transitory computer readable storage medium of claim 15, wherein configuring the persistent fast storage to store the set of metadata objects stored on the persistent disk storage includes:
  flushing dirty metadata objects of the subset of metadata objects from the volatile cache memory; and
  copying the set of metadata objects from the persistent disk storage to the persistent fast storage.

17. The non-transitory computer readable storage medium of claim 15, wherein updating the inconsistent metadata objects of the set of metadata objects stored on the persistent fast storage during the file system recovery includes:
  detecting an existence of a particular metadata object of the set of metadata objects being updated in the volatile cache memory and the persistent fast storage;
  upon determining that the particular metadata object exists in the volatile cache memory but not the persistent fast storage:
    copying the particular metadata object from the volatile cache memory to the persistent fast storage;
  upon determining that the particular metadata object does not exist in the volatile cache memory and the persistent fast storage:
    copying the particular metadata object from the persistent disk storage to the persistent fast storage; and
  allowing update of the particular metadata object on the persistent fast storage.

18. The non-transitory computer readable storage medium of claim 17, wherein configuring the persistent disk storage to store the set of metadata objects of the file system stored in the persistent fast storage includes:
  copying the set of metadata objects from the persistent fast storage to the persistent disk storage.

19. The non-transitory computer readable storage medium of claim 18, wherein the method further comprises:
  enabling the set of metadata objects in persistent disk storage to be accessed via the subset of the set of metadata objects in the volatile cache memory.

20. The non-transitory computer readable storage medium of claim 18, wherein each metadata object of the set of metadata objects is copied back to a same location in the persistent disk storage that the metadata object occupied prior to being copied to the persistent fast storage.

* * * * *